US012190558B2

(12) United States Patent
Liu et al.

(10) Patent No.: US 12,190,558 B2
(45) Date of Patent: Jan. 7, 2025

(54) VIEW SYNTHESIS FROM SPARSE VOLUME DATA STRUCTURE

(71) Applicant: Lemon Inc., Grand Cayman (KY)

(72) Inventors: Celong Liu, Los Angeles, CA (US);
Lelin Zhang, Los Angeles, CA (US);
Qingyu Chen, Los Angeles, CA (US);
Yunzhu Li, Los Angeles, CA (US);
Haoze Li, Los Angeles, CA (US); Xing Mei, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 390 days.

(21) Appl. No.: 17/806,410

(22) Filed: Jun. 10, 2022

(65) Prior Publication Data

US 2023/0401815 A1 Dec. 14, 2023

(51) Int. Cl.
*G06V 10/40* (2022.01)
*G06V 10/56* (2022.01)
*G06V 10/82* (2022.01)

(52) U.S. Cl.
CPC ............ *G06V 10/513* (2022.01); *G06V 10/56* (2022.01); *G06V 10/82* (2022.01)

(58) Field of Classification Search
None
See application file for complete search history.

(56) References Cited

U.S. PATENT DOCUMENTS

| 11,961,266 | B2* | 4/2024 | Zhang | G06T 13/40 |
| 12,002,150 | B2* | 6/2024 | Zhao | G06T 15/506 |
| 12,026,892 | B2* | 7/2024 | Brown | G06T 17/00 |
| 12,039,657 | B2* | 7/2024 | Wang | G06N 3/048 |
| 2022/0180602 | A1* | 6/2022 | Hao | G06T 11/00 |
| 2022/0301252 | A1* | 9/2022 | Wang | G06N 3/048 |

(Continued)

FOREIGN PATENT DOCUMENTS

| CN | 113706714 A | 11/2021 |
| CN | 114119838 A | 3/2022 |
| WO | 2022/108031 A1 | 5/2022 |

OTHER PUBLICATIONS

Mildenhall et al. ("NeRF: Representing Scenes as Neural Radiance Fields for view Synthesis," arXiv:2003.08934v2 [cs.CV], Aug. 3, 2020. Cited in IDS and provided. (Year: 2020).*

(Continued)

*Primary Examiner* — Anand P Bhatnagar
(74) *Attorney, Agent, or Firm* — Faegre Drinker Biddle & Reath LLP

(57) ABSTRACT

A computer-implemented method for transforming a neural radiance field model is described. A plurality of inputs are provided to a neural radiance field (NeRF) model that represents a 3-dimensional space having a subject, wherein each input of the plurality of inputs includes a location and a view direction and corresponds to respective colors of voxels that represent the 3-dimensional space. A spectral analysis is performed on a plurality of outputs of the NeRF model based on the plurality of inputs, wherein the plurality of outputs include the respective colors of the voxels. Frequency components of the spectral analysis that represent colors for at least some of the voxels are extracted. A sparse volume data structure that represents the 3-dimensional space and the respective colors for the at least some of the voxels is generated.

20 Claims, 9 Drawing Sheets

(56) References Cited

U.S. PATENT DOCUMENTS

| | | | |
|---|---|---|---|
| 2022/0319055 A1* | 10/2022 | Zhang | G06T 9/002 |
| 2023/0130281 A1* | 4/2023 | Brown | G06N 3/04 |
| | | | 345/420 |
| 2023/0281955 A1* | 9/2023 | Ackerson | G06T 15/506 |
| | | | 382/274 |
| 2023/0360278 A1* | 11/2023 | Keller | G06T 3/4092 |
| 2024/0070762 A1* | 2/2024 | Wang | G06V 10/82 |

OTHER PUBLICATIONS

International Search Report and Written Opinion received for PCT Patent Application No. PCT/SG2023/050371, mailed on Dec. 20, 2023, 3 pages.

B. Mildenhall, P. P. Srinivasan, M. Tancik et al., "NeRF: Representing Scenes as Neural Radiance Fields for View Synthesis," arXiv:2003.08934v2 [cs.CV], Aug. 3, 2020.

* cited by examiner

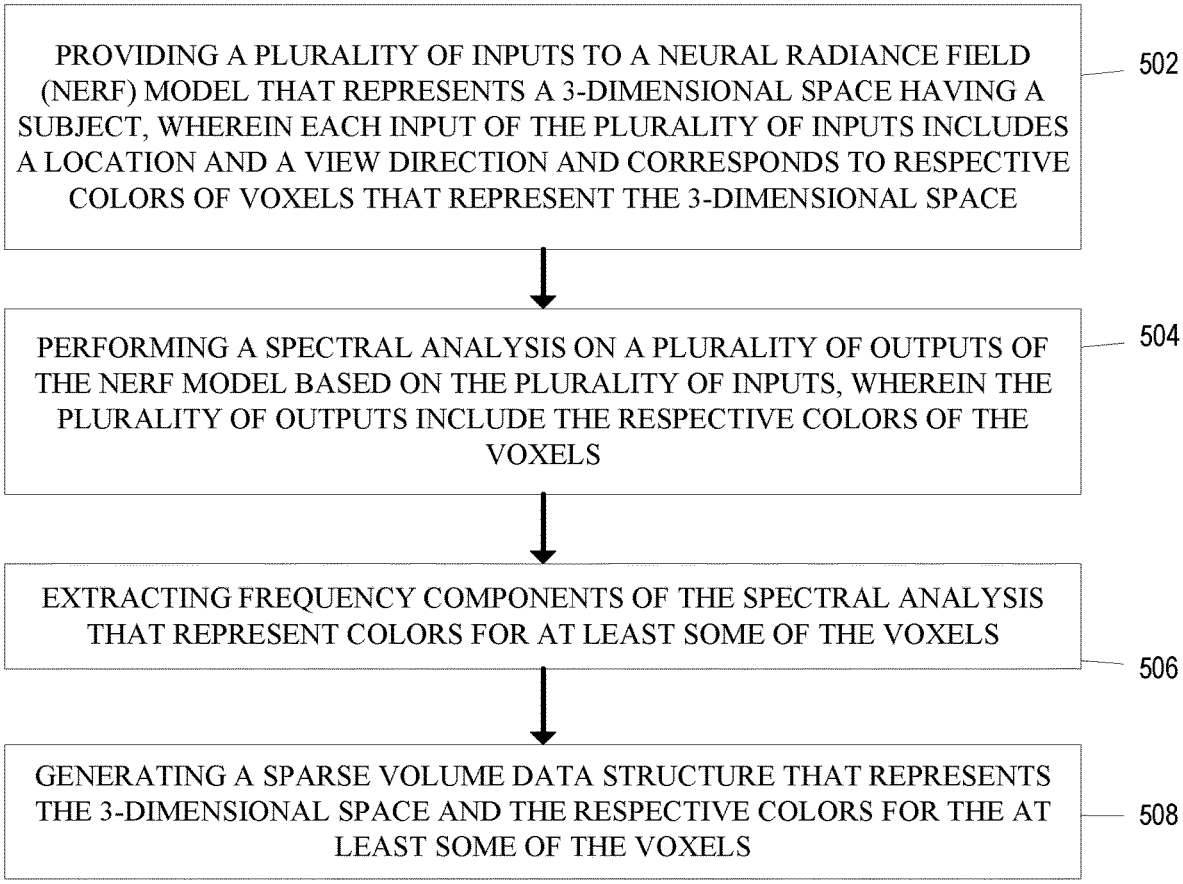

VIEW SYNTHESIS FROM SPARSE VOLUME DATA STRUCTURE

BACKGROUND

Three dimensional scene reconstruction is of interest in computer vision technology and has played an important role in digital assets, augmented reality, virtual reality, games, movies, and other applications. In recent years, with the rapid development of the field of deep learning, deep learning based 3D scene reconstruction technologies have emerged, including a class of implicit scene representations represented by Neural Radiance Fields (NeRF). NeRF systems use neural network models to learn representations of a scene based on several images of the scene taken from different views (e.g., a top view, a side view, etc.), with the aim of providing a rendering of a realistic image of the scene from an unobserved viewpoint. However, the computational requirements of NeRF are high and present a challenge for real-time applications. Generally, rendering a view from a trained NeRF requires up to millions of inference calculations by the neural network model, and rendering an 800× 600 image may take more than 10 minutes on some hardware. Although some follow-up studies based on NeRF have found that rendering can be accelerated by precomputation, such methods often require additional memory space to store these precomputation results. For an 800×600 image, its runtime memory consumption can be as high as 6 Gigabits, so it may not be able to be performed on common mobile phones.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to neural network models for synthesizing novel views.

In one aspect, a computer-implemented method for transforming a neural radiance field model is provided. The method includes: providing a plurality of inputs to a neural radiance field (NeRF) model that represents a 3-dimensional space having a subject, wherein each input of the plurality of inputs includes a location and a view direction and corresponds to respective colors of voxels that represent the 3-dimensional space; performing a spectral analysis on a plurality of outputs of the NeRF model based on the plurality of inputs, wherein the plurality of outputs include the respective colors of the voxels; extracting frequency components of the spectral analysis that represent colors for at least some of the voxels; and generating a sparse volume data structure that represents the 3-dimensional space and the respective colors for the at least some of the voxels.

In another aspect, a computer-implemented method for rendering an image of a subject in a 3-dimensional space is provided. The method includes: processing rays from a view point through pixels of the image into the 3-dimensional space, the 3-dimensional space being represented by a sparse volume data structure and a residual neural network; sampling voxels along the rays and accumulating colors for the voxels according to color values stored within the sparse volume data structure; providing a location and viewing angle of the view point to the residual neural network to obtain residual colors for the pixels of the image; and rendering the image by combining the accumulated colors and the residual colors for each pixel of the image.

In yet another aspect, a non-transient computer-readable storage medium comprising instructions being executable by one or more processors is provided. The instructions, when executed by the one or more processors, cause the one or more processors to: provide a plurality of inputs to a neural radiance field (NeRF) model that represents a 3-dimensional space having a subject, wherein each input of the plurality of inputs includes a location and a view direction and corresponds to respective colors of voxels that represent the 3-dimensional space; perform a spectral analysis on a plurality of outputs of the NeRF model based on the plurality of inputs, wherein the plurality of outputs include the respective colors of the voxels; extract frequency components of the spectral analysis that represent colors for at least some of the voxels; and generate a sparse volume data structure that represents the 3-dimensional space and the respective colors for the at least some of the voxels.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 5 shows a flowchart of an example method for transforming a neural radiance field model, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a computing device having a processor configured to perform novel view synthesis (NVS). The computing device is configured to pre-compute a neural radiance field (NeRF) model for a scene based on predictive computation and transform the NeRF model into a sparse volume data structure. The sparse volume data structure is greatly reduced in size compared to the NeRF model without reducing accuracy and speed of computation, and ensures that runtime memory and video card memory consumption are controllable. Moreover, the computing device is configured to connect calculation data streams and rendering data streams for processing by a graphical processing unit (GPU), enabling real-time rendering on mobile phones or smart phones. To achieve this, the computing device is configured to perform a precomputation method for NeRF-like algorithms that converts a NeRF model into a sparse volume data structure, and perform a GPU computation and rendering process that is efficient for a sparse volume data structure. The transformed model representation (i.e., the sparse volume data structure) retains the NeRF model's ability to render fine geometric details and view-related looks (e.g., specularity, reflections), is compact (less than 100 megabytes per scene on average), and can be rendered in real-time on consumer hardware (e.g., 30 frames per second on an iPhone) when configured with a rendering engine described herein.

Figure 1:
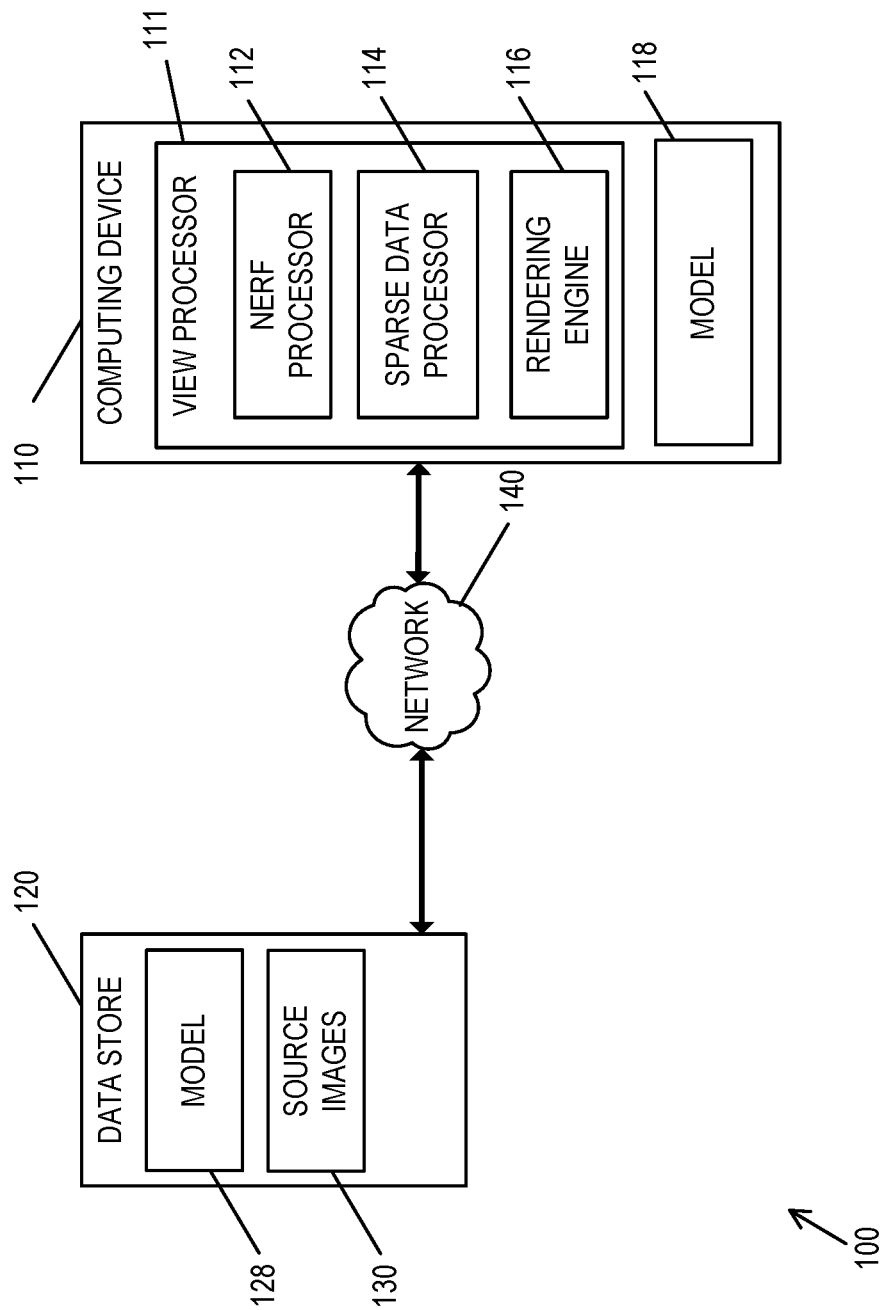
FIG. 1 shows a block diagram of an example of a system for novel view synthesis, according to an example embodiment.

This and many further embodiments for a computing device are described herein. For instance, FIG. 1 shows a block diagram of an example of a system 100 for synthesizing a novel view, according to an example embodiment. The system 100 includes a computing device 110 that is configured to train a neural network model, such as a neural network model 118 or neural network model 128, using source images 130. The computing device 110 includes a view processor 111 that is configured to perform view processing to synthesize a novel view of a subject or scene based on the neural network model 118 or 128. The system 100 may also include a data store 120 that is communicatively coupled with the computing device 110 via a network 140, in some examples. In some examples, the computing device 110 includes a first neural network model 118 for a NeRF model and a second neural network model (not shown) for a residual neural network model, described below.

Generally, the source images 130 are images that represent a scene, an object or group of objects, a person or group of people, or other suitable subject. In some examples, the source images 130 are images captured by a digital camera, digital image processor, an image capture module (e.g., of a webcam or smartphone), or other suitable image capture device. In other examples, some or all of the source images 130 are generated by a 2D or 3D rendering module and snapshots or screenshots are captured based on an output of the rendering module or content on a display (e.g., computer monitor or smartphone screen).

The source images 130 are referred to as "sparse" source images because they do not include images for every possible view of the scene. For example, the source images 130 may include a top view of a subject, a left side view of the subject, and a right perspective view of the subject, but omit a left perspective view of the subject, a right side view of the subject, etc. In some examples, the source images 130 include two, three, four, or more images of the subject and may include tens, hundreds, or thousands of images from different positions (e.g., x, y, and z coordinates in a 3-D space) and orientations (e.g., a polar angle θ and azimuthal angle φ). Training of the neural network model 118 or 128 is described below with respect to FIG. 2.

The computing device 110 may be any type of computing device, including a smartphone, mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). The computing device 110 may be configured to communicate with a social media platform, cloud processing provider, software as a service provider, or other suitable entity, for example, using social media software and a suitable communication network. The computing device 110 may be configured to execute one or more software applications (or "applications") and/or services and/or manage hardware resources (e.g., processors, memory, etc.), which may be utilized by users of the computing device 110.

In the example shown in FIG. 1, the view processor 111 includes a NeRF processor 112, a sparse data processor 114, and a rendering engine 116. In other examples, one or more of the NeRF processor 112, the sparse data processor 114, or the rendering engine 116 may be formed as a combined processor. In some examples, at least some portions of the view processor 111 may be combined with the neural network model 118, for example, by including a neural network processor or other suitable processor configured to implement a neural network model. In other words, the neural network model 118 may be integral with the view processor 111 and implemented with, or as, a neural network processor. In some examples, the neural network model 118 is omitted from the computing device 110 and the neural network model 128 is utilized instead.

In some examples, one or more of the NeRF processor 112, the sparse data processor 114, or the rendering engine 116 are located in other computing devices (not shown). In one such example, a first computing device includes the NeRF processor 112 and the sparse data processor 114 while a second computing device includes the rendering engine 116. In another examples, a first computing device includes the NeRF processor 112, a second computing device includes the sparse data processor 114, and a third computing device includes the rendering engine 116.

The NeRF processor 112 is configured to train the neural network model 118 to synthesize views based on source images, such as source images 130. In some examples, the NeRF processor 112 performs the neural radiance field training process 200, described below with respect to FIG. 2.

The sparse data processor 114 is configured to convert the neural network model 118 or 128 (e.g., a NeRF model or NeRF-like model) into a sparse volume data structure that represents the neural network model. Generally, a NeRF-like model is trained to model a neural radiance field for views of a subject within a 3-dimensional space or scene as a continuous multivariate function. However, for most real scenes, a geometric distribution is predominantly composed of a surface of the subject, which means that most of the areas in the neural radiance field are actually empty, and there is no need to perform a value operation for those empty areas. Moreover, since rendering of a view itself is constrained by discretized resolution, a completely continuous radiation field is also unnecessary. In other words, as long as value operations may be performed on limited points in space, the rendering can be completed.

The sparse data processor 114 takes advantage of these concepts by first discretizing a target space of a NeRF-like model and modeling the target space as a set of small voxels. A voxel represents a value on a regular grid in three-dimensional space, but generally does not have its position explicitly encoded. Instead, a rendering engine, such as rendering engine 116, infers the position of a voxel based upon its position relative to other voxels. In other words, the rendering engine 116 infers a position of a voxel based on its position in the sparse volume data structure that represents a subject or scene. With a voxel representation of the NeRF-like model, a result of the neural radiation field may then be calculated offline for a location associated with each voxel and saved.

For a given spatial location or voxel, its color is related to a viewing direction. If the results of each angle are stored for each voxel, memory storage overhead would be very large. To improve storage efficiency, the sparse data processor 114 is configured to decompose the viewing direction-related color change into diffused components, low-frequency components, and high-frequency components. This decomposition is described below.

The rendering engine 116 is configured to render a view of a subject based on the sparse volume data structure. In some examples, the rendering engine 116 is configured as one or more software modules or firmware modules that are executed on a graphics processing unit (GPU), central processing unit (CPU), or other suitable processor.

The neural network model 118 is trained using the view processor 111 (e.g., by the NeRF processor 112) and configured to process input coordinates and orientation to provide a synthesized view of a subject. In some examples, the neural network model 118 is implemented as a deep fully-connected neural network without convolutional layers, such as a multilayer perceptron (MLP) model. The neural network model 128 is generally similar to the neural network model 118, but is stored remotely from the computing device 110 (e.g., at the data store 120).

Data store 120 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. The data store 120 may store the neural network model 128 and/or source images 130 (e.g., images for training the neural network models 118 and/or 128), for example. In some examples, the data store 120 provides the source images 130 to the view processor 111 for training the neural network model 118 and/or the neural network model 128. In some examples, one or more data stores 120 may be co-located (e.g., housed in one or more nearby buildings with associated components such as backup power supplies, redundant data communications, environmental controls, etc.) to form a datacenter, or may be arranged in other manners. Accordingly, in an embodiment, one or more of data stores 120 may be a datacenter in a distributed collection of datacenters.

Network 140 may comprise one or more networks such as local area networks (LANs), wide area networks (WANs), enterprise networks, the Internet, etc., and may include one or more of wired and/or wireless portions. Computing device 110 and data store 120 may include at least one wired or wireless network interface that enables communication with each other (or an intermediate device, such as a Web server or database server) via network 140. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 140 include a local area network (LAN), a wide area network (WAN), a personal area network (PAN), the Internet, and/or any combination thereof.

Figure 2:
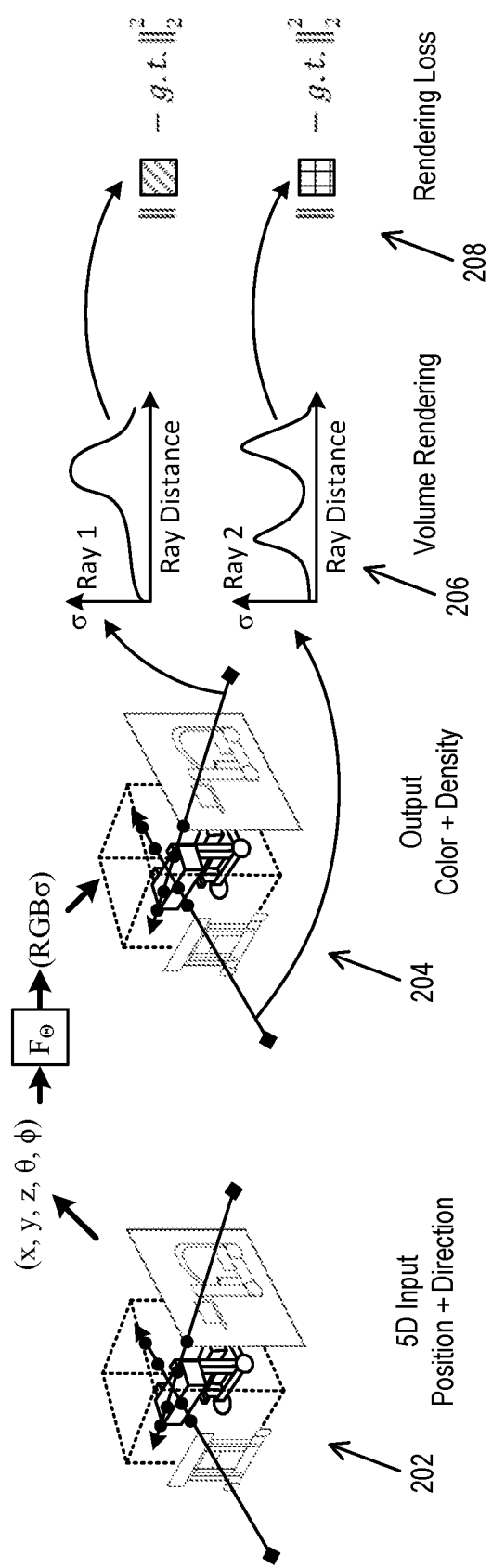
FIG. 2 shows a diagram of an example of a prior art neural radiance field training process.

FIG. 2 shows a diagram of an example of a prior art neural radiance field training process 200. The process 200 generally describes synthesizing images by sampling (202) 5-dimensional input coordinates along camera rays. The input coordinates generally indicate a location (x, y, z) in 3-dimensional space and a viewing direction or orientation in spherical coordinates ($\theta$, $\phi$) which may be combined as (x, y, z, $\theta$, $\phi$). The input coordinates are provided to a multi-layer perceptron (MLP) neural network model ($F_\theta$, such as neural network model 118 or 128) to produce (204) a color (RGB) and a volume density $\sigma$. Volume rendering techniques composite (206) the RGB values and volume density $\sigma$ into an image. Rendering functions of 204 are differentiable, so the neural network model may be trained (208) using a loss function that minimizes a residual between synthesized images and ground truth ("g.t.") images. Further details of the neural radiance field training process are described by Mildenhall, B., et al. in "NeRF: Representing Scenes as Neural Radiance Fields for View Synthesis", *European Conference on Computer Vision* (Aug. 23, 2020; pp. 405-421), Springer, Cham. Although the process 200 is described with respect to the MLP neural network model, other neural network models or NeRF-like models may be used, in other examples.

Generally, the process 200 abstracts a scene into a radiance field, that is, for any point in space, the color and transparency of the light emitted in any direction can be calculated. When such a radiance field can be acquired, then synthesizing images from any viewing direction is a simple numerical accumulation process. NeRF uses a neural network model (e.g., neural network model 118 or 128) to represent the radiance field. The input of the neural network model 118 is the location (x, y, z) in 3-dimensional space and the viewing direction or orientation in spherical coordinates ($\theta$, $\phi$) from which a view should be generated (e.g., a virtual camera location), and the output is color and transparency for voxels within the 3-dimensional space. Input images from different viewing directions may be provided to train this neural network, and NVS can be performed after the training is completed. Because this method is simple and effective, a large number of researchers have conducted follow-up research based on NeRF, forming a large class of NVS solutions. However, utilization of NeRF requires a complete neural network inference for every position in space, which makes its execution inefficient and difficult to implement.

Figure 3:
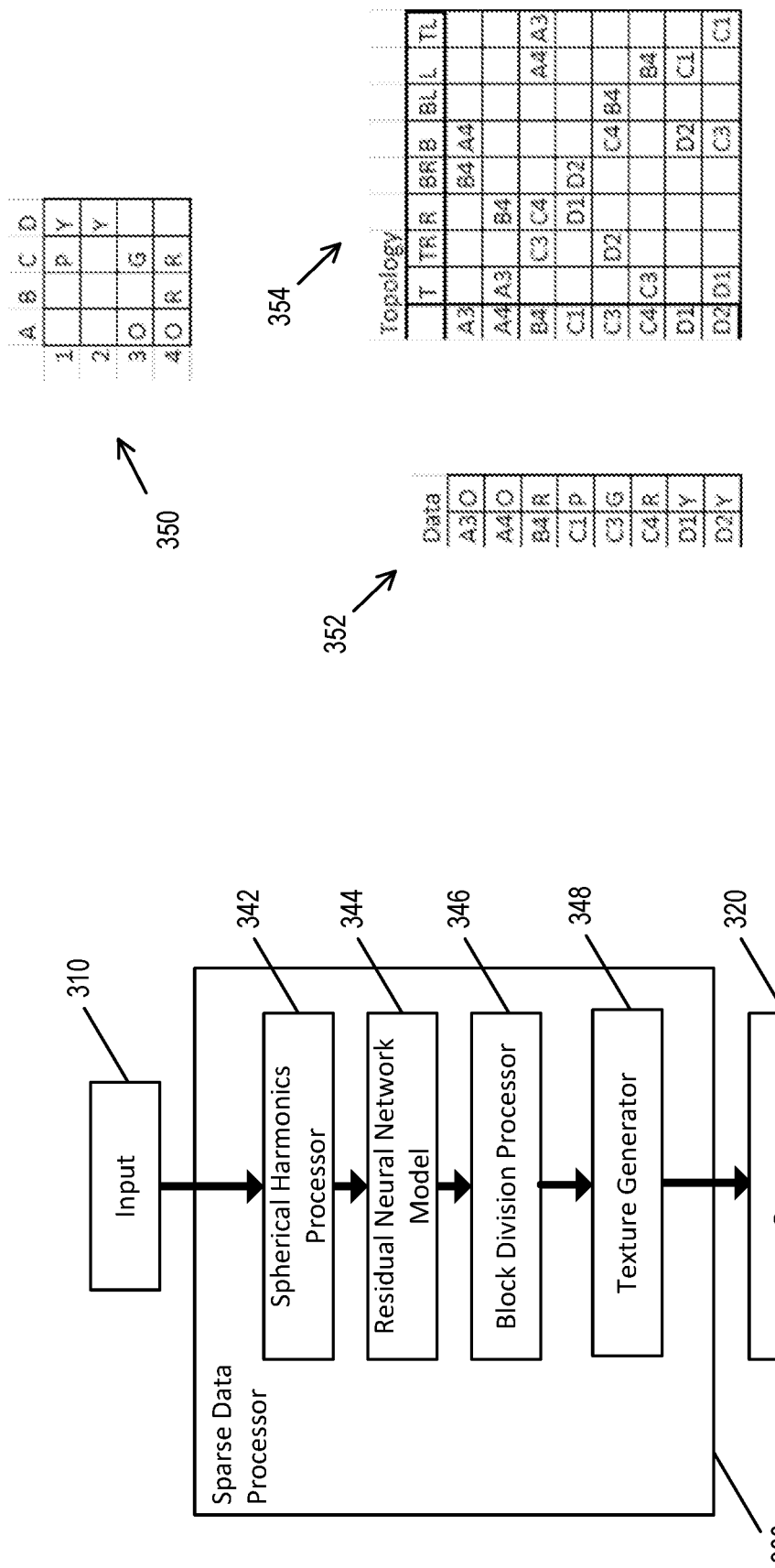
FIG. 3A shows a diagram of an example sparse data processor for generating a sparse volume data structure, according to an example embodiment.
FIG. 3B shows a diagram of an example sparse volume data structure and corresponding first and second textures, according to an example embodiment.

FIG. 3A shows a diagram of an example sparse data processor 300 for generating a sparse volume data structure, according to an example embodiment. The sparse data processor 300 generally corresponds to the sparse data processor 114 and is configured to process and convert an input 310, such as a NeRF-like model, into an output 320, such as a sparse volume data structure. As described above, the sparse data processor 300 is configured to convert the neural network model 118 or 128 into a sparse volume data structure that represents the neural network model by decomposing a viewing direction-related color change for each voxel into diffused components, low-frequency components, and high-frequency components.

The diffused component generally represents a color component for a voxel that is independent of viewing direction. For a target location (i.e., voxel), the sparse data processor 300 calculates a plurality of colors in different directions using the trained neural network model 118. In one example, the plurality of colors includes one color for each viewing direction (θ, φ) at 5° intervals, for example, at (0°, 0°), (0°, 5°), (0°, 10°), . . . (0°, 355°), (5°, etc. In other examples, a different interval is used, such as 1°, 2°, 10°, or another suitable interval. In some examples, the intervals are larger for some viewing directions to reduce computation costs and smaller for other viewing directions to improve color accuracy. For example, viewing directions that are less likely to be used (e.g., very low downward angles, very high upward angles) may use larger intervals while commonly used viewing directions (e.g., generally horizontal angles) may use smaller intervals.

The sparse data processor 300 includes a spherical harmonics processor 342 that performs spherical-based spectral analysis techniques (e.g., spherical harmonics using a Fourier transform) for the plurality of colors, extracts a first component with frequency 0 as the diffused component at this target location, and stores corresponding RGB values as the diffused component. RGB values may be stored as a set of values for each color at a location, such as (235, 117, 21) for an orange color, with a range from 0 to 255 for 8 bits of color, 0 to 65,535 for 16 bits of color, or another suitable range. In other examples, the RGB values are stored as hex values, such as #eb7515 for the orange color. Similar to the diffused component calculation, the sparse data processor 300 extracts a low frequency component with the first two frequencies of spherical harmonics, storing 9 corresponding RGB values, for example, respective RGB values for:

$$Y_0^0, Y_{-1}^{-1}, Y_1^0, Y_1^1, Y_2^{-2}, Y_2^{-1}, Y_2^0, Y_2^1, Y_2^2$$

In other examples, the sparse data processor 300 may extract a different number of low frequency components, such as the first three frequencies and storing 16 corresponding RGB values, however additional low frequency components generally requires more processing resources.

In the spectrum analysis results obtained by spherical harmonics, the recovery of high-frequency information often needs to use many components (>100) to meet certain accuracy requirements. Storing them would consume a significant amount of memory, but contribution for a final rendered color from them (e.g., when combined with the diffused component and low frequency component) is often weak, so the benefit for direct storage is very low. Due to the small contribution, the sparse data processor 300 defines the contribution of high-frequency components to the final rendered color as color residuals. In fact, the distribution of color residuals in the same scene has certain patterns. For example, the lighting in the same scene is generally consistent. The material distribution is roughly continuous, so the sparse data processor 300 is configured to use a simpler, residual neural network model 344 to model the color residuals. The input of this residual neural network model 344 is also the 3D coordinates and 2D direction information (x, y, z, θ, φ) and the output is the color residuals. Training data for the residual neural network model 344 is obtained by subtracting the diffused component and the low-frequency component from the NeRF inference result. The residual neural network model 344 has only one layer in some examples and may be trained in less than 100 samples.

Weights of the trained residual neural network model 344 are stored as a gray scale image. In this way, the sparse data processor 300 provides diffused volume data and low-frequency volume data based on a NeRF model, as well as a gray scale image representing the residual neural network model 344.

FIG. 3B shows a diagram of an example data structure 350 and corresponding first texture 352 and second texture 354, according to an example embodiment. For ease of explanation, the data structure 350 is 2-dimensional with grid coordinates (A to D and 1 to 4) and a single color value, but may be readily extrapolated to a 3-dimensional space with multiple color values (i.e., the diffuse color component and the low-frequency color components). The data structure 350 is generally empty, but includes an orange color at A3 and A4, a red color at B4 and C4, a pink color at C1, a green color at C3, and a yellow color at D1 and D2. Further explanation of the first texture 352 and second texture 354 is provided below.

Figure 4:
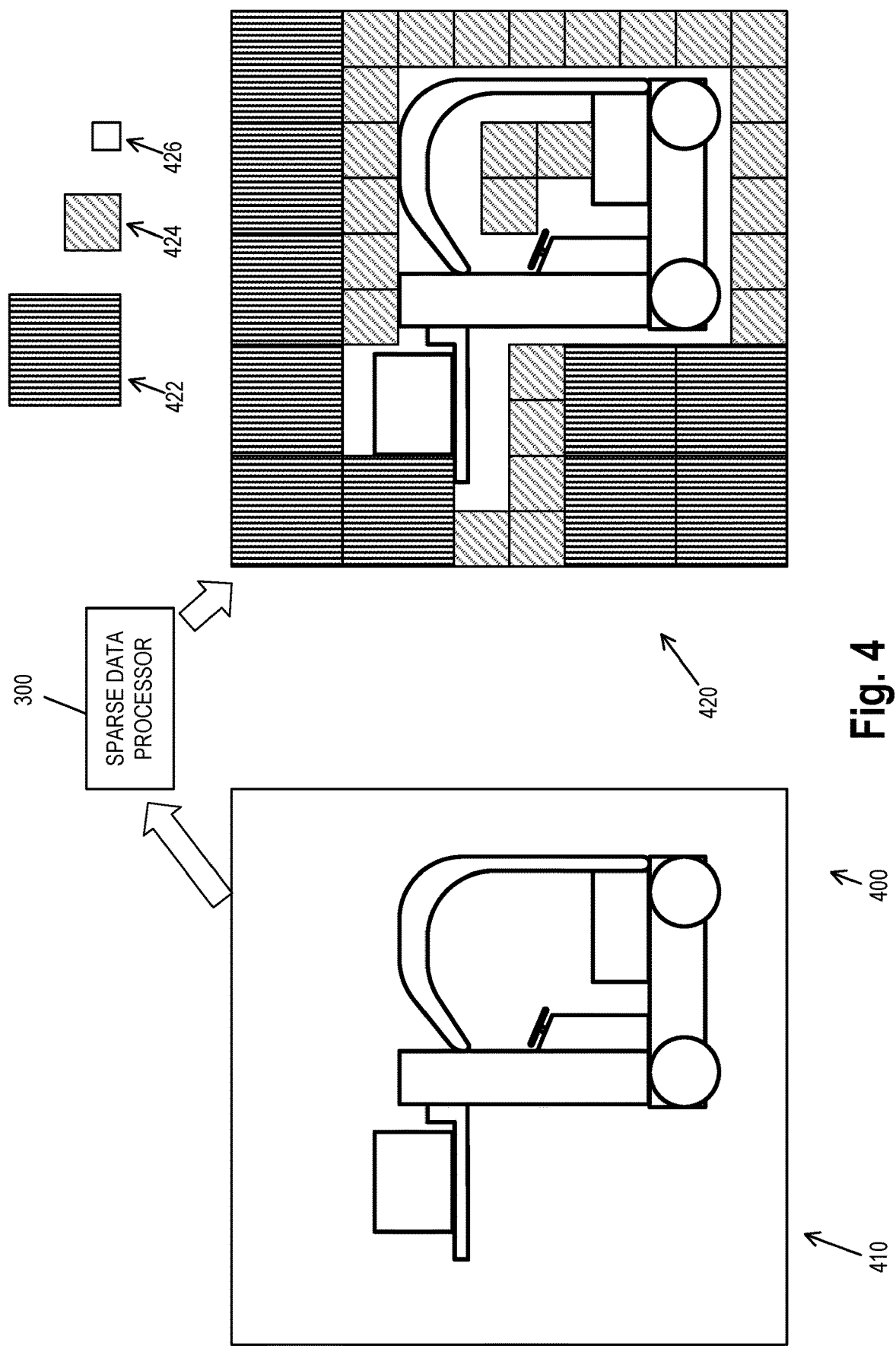
FIG. 4 shows a diagram of an example diagram for converting a NeRF-like model into a sparse volume data structure, according to an example embodiment.

FIG. 4 shows a diagram of an example diagram 400 for converting a NeRF-like model 410 of a subject (a forklift) in 2-dimensional space into a sparse volume data structure 420, according to an example embodiment. The diagram 400 includes the sparse data processor 300. Although the sparse data processor 300 provides two volumes of data, the diffused volume data and the low-frequency volume data, for most scenarios, these two volumes of data are very sparse, and the useful data is usually less than 5% of the total. If the volume data is stored as a conventional square lattice (or cube lattice, in a 3-dimensional example), the space utilization rate will be very low. To solve this problem, the sparse data processor 300 includes a block division processor 346 that is configured to divide the space (i.e., the x, y space for 2-D, the x, y, z space for 3-D) into non-uniformly sized blocks, so that a large empty area (i.e., without the subject or not adjacent to the subject) can be represented by only one large block (e.g., block 422) or a medium-sized block (e.g., block 424), and then blocks where valid data is located (e.g., adjacent to a surface of the subject) may be represented by smaller blocks (e.g., block 426), which can effectively compress the size of the data. Accordingly, the NeRF model 410 is converted into two sparse volume data structures 420 (i.e., for the diffused color component and the low frequency component) and a gray scale image that represents the color residual network. In some examples, the two sparse volume data structures are combined into a single sparse volume data structure. In the example shown in FIG. 4, the large blocks 422 and medium blocks 424 are shown overlaid on the forklift, but the small blocks 426 are not shown for clarity. Generally, the small blocks 426 would overlay a remainder of the data structure 420.

Generally, resources on a mobile phone or smartphone for rendering a view (i.e., for the rendering engine 116) are limited, for example, a size of graphics processing memory, computation form (e.g., processing instructions that are available), and computation speed (e.g., clock frequency). Using the sparse volume data structure described above, the compressed model volume is generally less than 100 megabits, so limitations of graphics processing memory are generally overcome for the rendering engine 116. For improved processing on typical smartphone processing hardware, the rendering engine 116 uses shading languages of a graphics API to implement the rendering on the GPU side, for example, using OpenGLES 3.0 or the iOS Metal framework.

For the graphics API of the smartphone, there are specific patterns for computation modes that are supported or even preferred. Generally, GPUs on a smartphone operate on regular organized graphical data (e.g., textures and geometry), and do not natively support the sparse volume data structure 420 described above. To overcome a lack of native support for the sparse volume data structure, the rendering engine 116 is configured to use two textures to represent a sparse volume data structure, denoted as a first texture and a second texture, where the first texture records the data of valid points in the sparse volume data structure, and the second texture records a connection relationship between blocks of the sparse volume data structure (e.g., a tree structure describing a topology of connected blocks). In this way, the rendering engine 116 uses the first and second textures to implement operations of a tree structure using a shading language (i.e., textures) with which most graphics APIs already support and can efficiently process. In some scenarios, expanding the sparse volume data structure 420 into two 2-dimensional textures, the sparsity of these two textures increases. In some examples, the sparse data processor 114 is configured to use 2D texture compression, such as using a KTX format or other suitable compressed format, to reduce the consumption of video card memory.

Referring again to FIG. 3B, the data structure 350 may be represented as a tree structure where a single node representing a larger first block encompassing A1, A2, B1, and B2 does not contain any data. Although a tree structure with nodes representing different sizes of blocks as shown in FIG. 4 is useful for representing the NeRF model, this approach is more challenging to implement within a typical GPU. The texture generator 348 is configured to convert the tree structure into a first texture 352 that records the data of valid points and a second texture 354 that records a connection relationship between blocks. In the example shown in FIG. 3B, the first texture 352 is a 2-dimensional texture having a first dimension corresponding to an index of a block (i.e., the grid structure of data structure 350) and a second dimension corresponding to the color of the corresponding block (O for orange, R for red, etc.). The second texture 354 is a 2-dimensional texture having a first dimension corresponding to an index of a block and a second dimension corresponding to a relative location of a neighboring block: top (T), top right (TR), right (R), bottom right (BR), bottom (B), bottom left (BL), left (L), and top left (TL), with values corresponding to an index or pointer to the corresponding block. As an example, cell A3 is adjacent to cells A2, B2, B3, B4, and A4, but cells A2, B2, and B3 do not contain color data and can be omitted from the first texture 352. However, a positional relationship between cell A3 and other cells that have data, such as cells A4 and B4, is provided by the second texture 354 where the bottom right (BR) value refers to B4 and the bottom (B) value refers to A4.

To synthesize a novel view, the rendering engine 116 processes a ray through each pixel from a point of view of a camera and samples several points on the ray. For each point, by using the sparse volume data structure and the residual neural network model 344, the rendering engine 116 calculates corresponding colors for the pixels and accumulates the values along the ray to calculate a final color of the pixel. Even when the sparse volume data structure is already sparse, no calculations are required in empty areas, but sampling on empty areas cannot be avoided. In order to reduce the sampling on empty areas during rendering, the rendering engine 116 is configured to generate multiple sets of mipmaps for the first texture and the second texture that represent the sparse volume data structure. Each color calculation starts from a bottom of the mipmap to determine whether it is empty, so that a blank area can be quickly passed and computation of valid data is started faster. Although the mipmaps may use additional memory, an increase in computation speed using the mipmaps improves overall processing speed by 80% in some examples.

FIG. 5 shows a flowchart of an example method 500 for transforming a neural radiance field model, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5A may be performed by the computing device 110 (e.g., via the view processor 111, the neural network model 118), or other suitable computing device. The steps of FIG. 5 may be performed using the neural network model 128, in some examples.

Method 500 begins with step 502. At step 502, a plurality of inputs are provided to a neural radiance field (NeRF) model that represents a 3-dimensional space having a subject, such as the NeRF-like model 410. Each input of the plurality of inputs includes a location and a view direction and corresponds to respective colors of voxels that represent the 3-dimensional space (e.g., as an output of the NeRF-like model 410).

At step 504, a spectral analysis is performed on a plurality of outputs of the NeRF model based on the plurality of inputs. The plurality of outputs include the respective colors of the voxels. In some examples, the spectral analysis is a Fourier analysis of colors across the input view directions and locations.

At step 506, frequency components that represent colors for at least some of the voxels are extracted from the spectral analysis. In some examples, a diffused color component is extracted as a fundamental frequency component and a low frequency component is extracted as first and second harmonic components. In some examples, step 506 also includes training a residual neural network to represent high frequency components of the spectral analysis (e.g., using residual neural network model 344). In one such example, the residual neural network is a single layer neural network and training data for the residual neural network model is obtained by subtracting the diffused color component and the low frequency component from a corresponding output of the NeRF model. Weights of the residual neural network model may be stored as a gray scale image and provided to a neural network model to render the high frequency components based on an input location and orientation.

At step 508, a sparse volume data structure that represents the 3-dimensional space and the respective colors for the at least some of the voxels is generated.

In some examples, the method 500 further comprises dividing the 3-dimensional space into non-uniformly sized blocks and storing colors associated with the frequency components for voxels within a corresponding block. For example, the block division processor 346 divides the 3-dimensional space into the blocks 422, 424, and 426. In one example, storing the colors comprises omitting colors within a block that are not adjacent to a surface of the subject. In other words, data for empty blocks within the 3-dimensional space is not stored. In some examples, dividing the 3-dimensional space comprises using larger sized blocks (e.g., block 422) for regions of the 3-dimensional space that are further from the subject and using smaller sized blocks (e.g., blocks 424) for regions of the 3-dimensional space that are closer to the subject.

In some examples, storing the colors comprises storing the colors within the blocks as a first texture and storing a relative position among the blocks as a second texture. For example, the texture generator 348 generates the first texture 352 and the second texture 354 which may be stored to represent the data structure 350.

In some examples, the sparse volume data structure is a tree data structure having nodes corresponding to the non-uniformly sized blocks.

Figure 6:
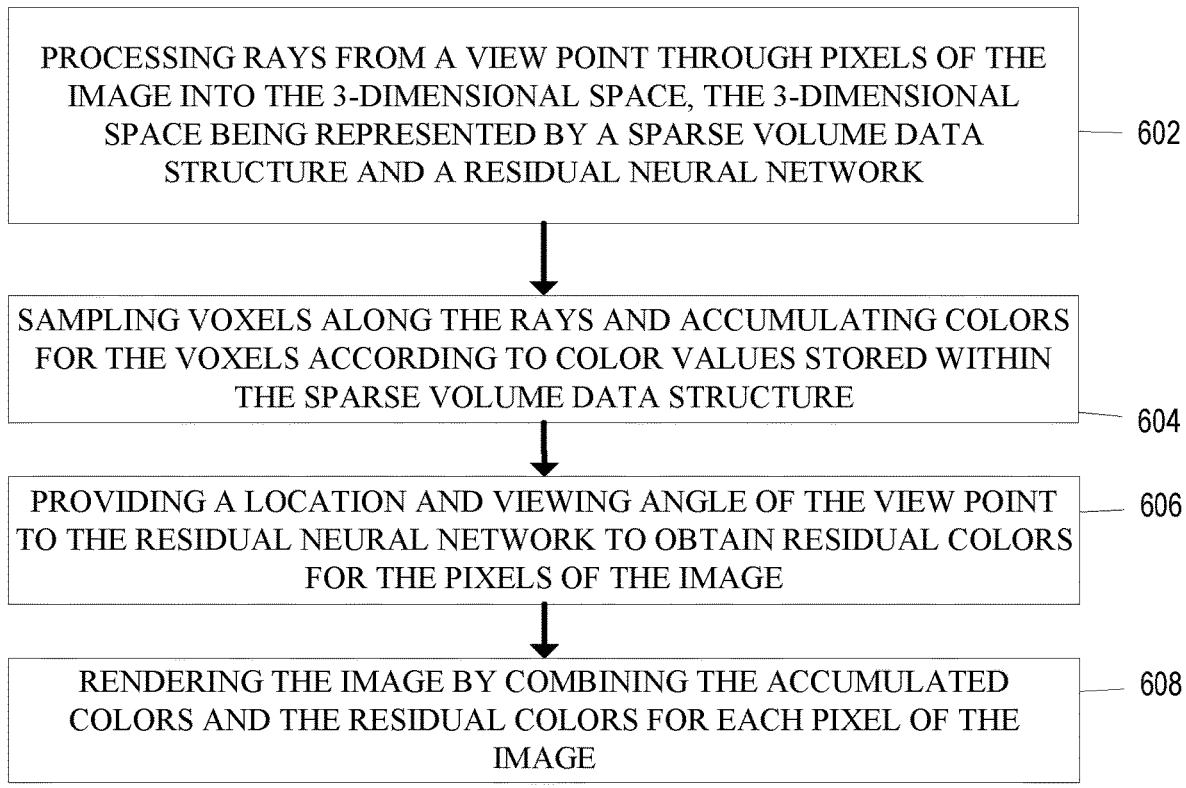
FIG. 6 shows a flowchart of an example method for rendering an image of a subject in a 3-dimensional space, according to an example embodiment.

FIG. 6 shows a flowchart of an example method 600 for rendering an image of a subject in a 3-dimensional space, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 6. Steps may be performed serially, in a partially overlapping manner, or fully in parallel. Thus, the order in which steps of method 600 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 6 may be performed by the computing device 110 (e.g., via the view processor 111, the neural network model 118), or other suitable computing device. The steps of FIG. 6 may be performed using the neural network model 128, in some examples.

Method 600 begins with step 602. At step 602, rays from a view point through pixels of the image into the 3-dimensional space are processed, the 3-dimensional space being represented by a sparse volume data structure and a residual neural network.

At step 604, voxels along the rays are sampled and colors for the voxels are accumulated according to color values stored within the sparse volume data structure.

At step 606, a location and viewing angle of the view point is provided to the residual neural network to obtain residual colors for the pixels of the image.

At step 608, the image is rendered by combining the accumulated colors and the residual colors for each pixel of the image.

Figure 7:
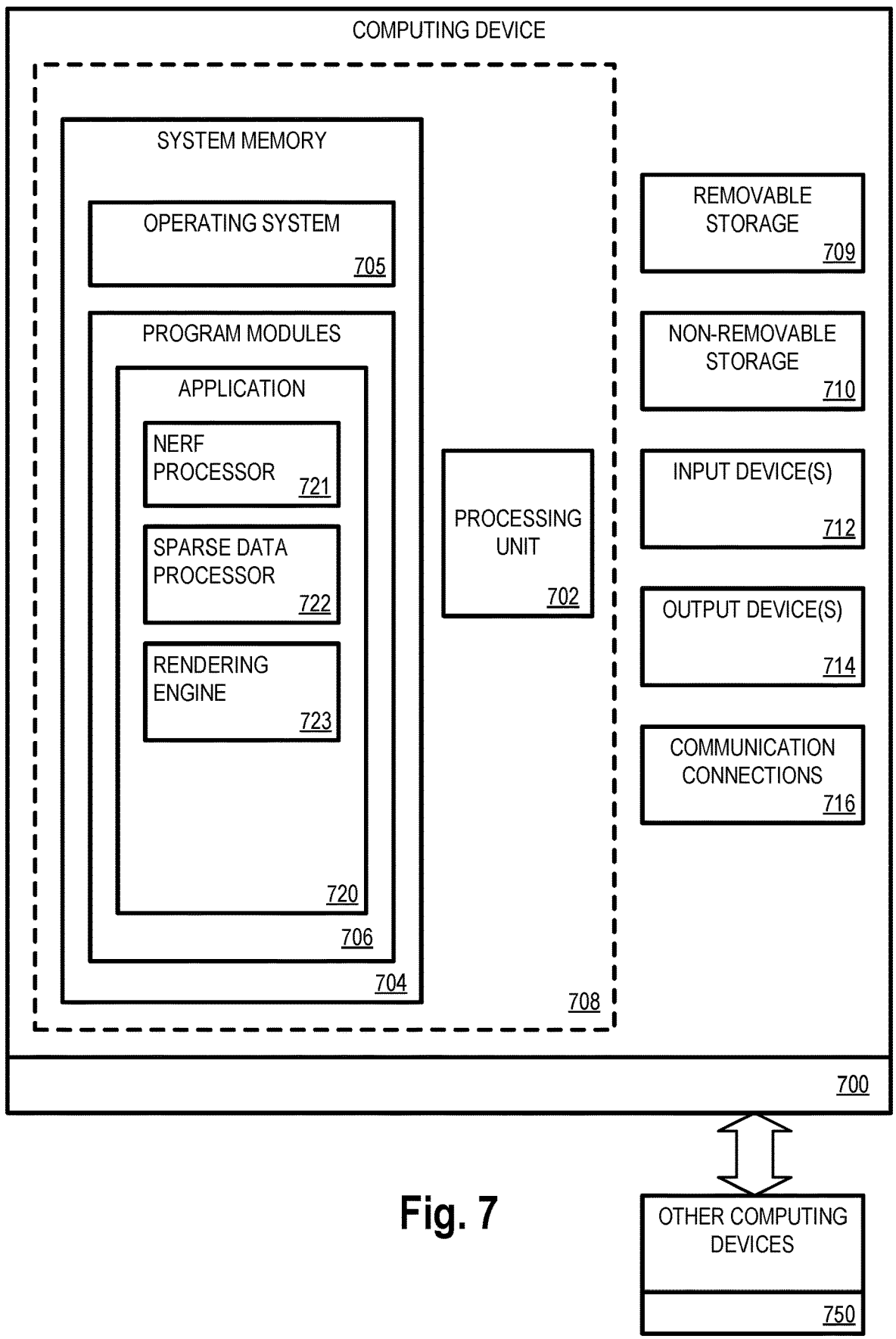
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may have computer executable instructions for implementing a view rendering application 720 on a computing device (e.g., computing device 110), including computer executable instructions for view rendering application 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running view rendering application 720, such as one or more components with regard to FIGS. 1 and 3, and, in particular, NeRF processor 721 (e.g., corresponding to NeRF processor 112), sparse data processor 722 (e.g., corresponding to sparse data processor 114), and rendering engine 723 (e.g., corresponding to rendering engine 116).

The operating system 705, for example, may be suitable for controlling the operation of the computing device 700. Furthermore, examples of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., view rendering application 720) may perform processes including, but not limited to, the aspects, as described herein. Other program modules that may be used in accordance with aspects of the present disclosure, and in particular for generating a view, may include NeRF processor 721, sparse data processor 722, and rendering engine 723.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8:
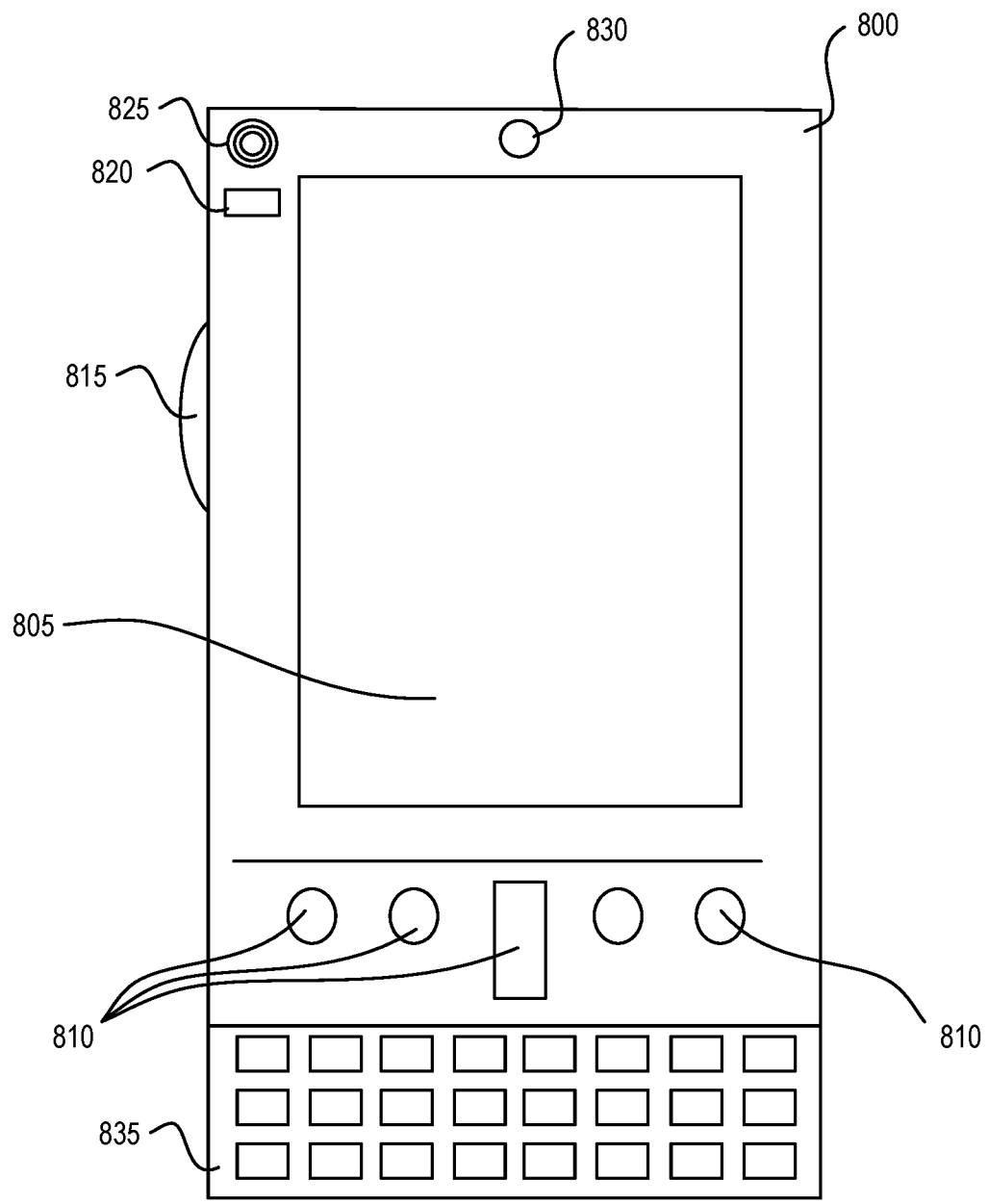
FIGS. 8 and 9 are simplified block diagrams of a mobile computing device with which aspects of the present disclosure may be practiced.
Figure 9:
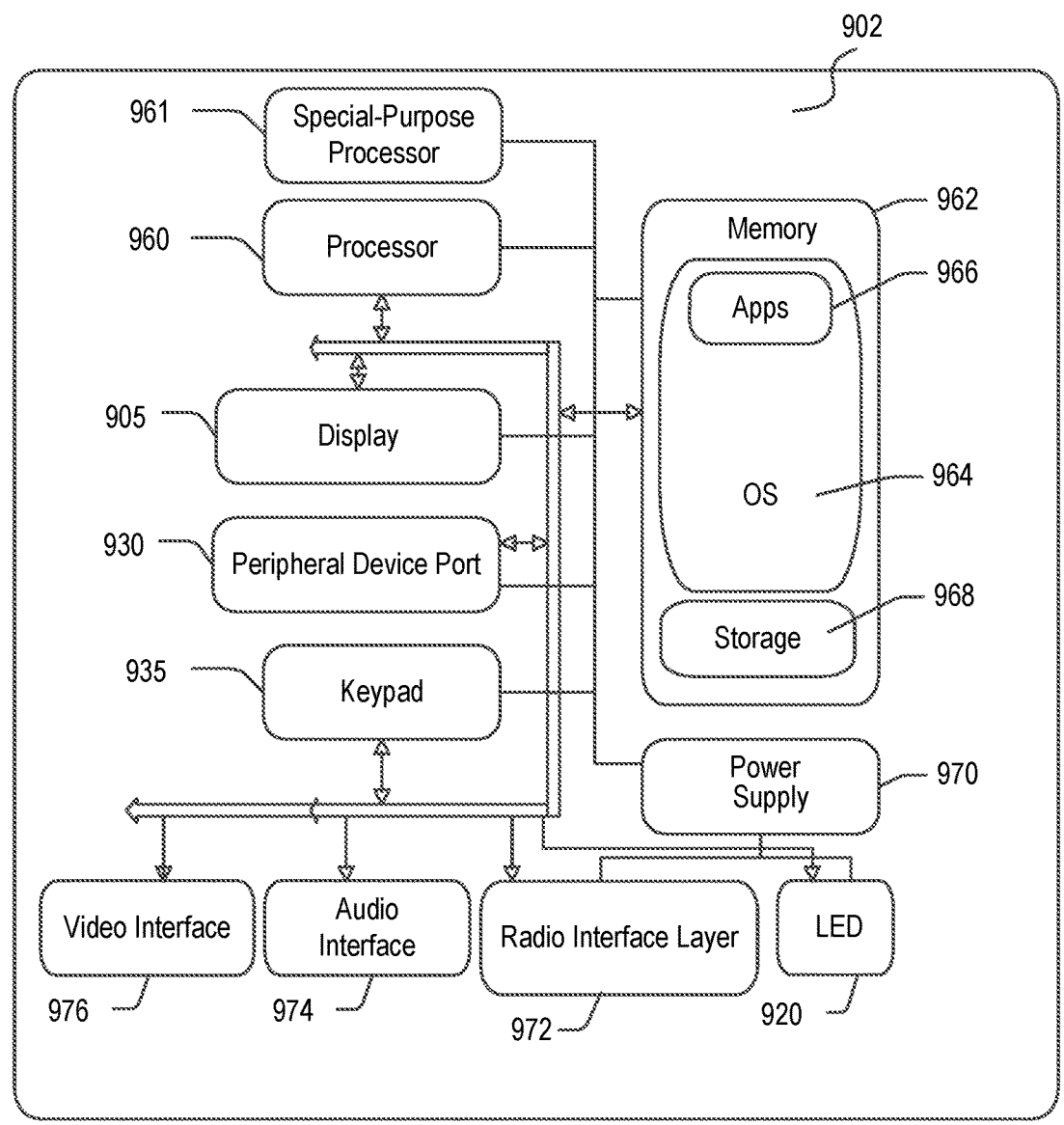

FIGS. 8 and 9 illustrate a mobile computing device 800, for example, a mobile telephone, a smart phone, wearable computer (such as a smart watch), a tablet computer, a laptop computer, and the like, with which examples of the disclosure may be practiced. In some aspects, the client may be a mobile computing device. With reference to FIG. 8, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some examples. In yet another alternative example, the mobile computing device 800 is a portable phone system, such as a cellular phone. The mobile computing device 800 may include a front-facing camera 830. The mobile computing device 800 may also include an optional keypad 835. Optional keypad 835 may be a physical keypad or a "soft" keypad generated on the touch screen display. In various examples, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 9 is a block diagram illustrating the architecture of one aspect of a mobile computing device. That is, the mobile computing device 800 can incorporate a system (e.g., an architecture) 902 to implement some aspects. In one example, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone. The system 902 may include a display 905 (analogous to display 805), such as a touch-screen display or other suitable user interface. The system 902 may also include an optional keypad 935 (analogous to keypad 835) and one or more peripheral device ports 930, such as input and/or output ports for audio, video, control signals, or other suitable signals.

The system 902 may include a processor 960 coupled to memory 962, in some examples. The system 902 may also include a special-purpose processor 961, such as a neural network processor. One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as email or other messages used by an email application, and the like. A synchronization application (not shown) also resides on the system 902 and is programmed to interact with a corresponding synchronization application resident on a host computer to keep the information stored in the non-volatile storage area 968 synchronized with corresponding information stored at the host computer.

The system 902 has a power supply 970, which may be implemented as one or more batteries. The power supply 970 may further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via an audio transducer 825 (e.g., audio transducer 825 illustrated in FIG. 8). In the illustrated example, the visual indicator 920 is a light emitting diode (LED) and the audio transducer 825 may be a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 825, the audio interface 974 may also be coupled to a microphone to receive audible input, such as to facilitate a telephone conversation. In accordance with examples of the present disclosure, the microphone may also serve as an audio sensor to facilitate control of notifications, as will be described below. The system 902 may further include a video interface 976 that enables an operation of peripheral device 930 (e.g., on-board camera) to record still images, video stream, and the like.

A mobile computing device 800 implementing the system 902 may have additional features or functionality. For example, the mobile computing device 800 may also include additional data storage devices (removable and/or non-removable) such as, magnetic disks, optical disks, or tape. Such additional storage is illustrated in FIG. 9 by the non-volatile storage area 968.

Data/information generated or captured by the mobile computing device 800 and stored via the system 902 may be stored locally on the mobile computing device 800, as described above, or the data may be stored on any number of storage media that may be accessed by the device via the radio interface layer 972 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 972 or via a distributed computing network. Similarly, such data/information may be readily transferred between computing devices for storage and use according to well-known data/information transfer and storage means, including electronic mail and collaborative data/information sharing systems.

As should be appreciated, FIGS. 8 and 9 are described for purposes of illustrating the present methods and systems and is not intended to limit the disclosure to a particular sequence of steps or a particular combination of hardware or software components.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In other configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s)

or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to systems and methods for novel view synthesis according to at least the examples provided in the sections below:

(A1) In one aspect, some examples include a computer-implemented method for transforming a neural radiance field model is provided. The method includes: providing a plurality of inputs to a neural radiance field (NeRF) model that represents a 3-dimensional space having a subject, wherein each input of the plurality of inputs includes a location and a view direction and corresponds to respective colors of voxels that represent the 3-dimensional space; performing a spectral analysis on a plurality of outputs of the NeRF model based on the plurality of inputs, wherein the plurality of outputs include the respective colors of the voxels; extracting frequency components of the spectral analysis that represent colors for at least some of the voxels; and generating a sparse volume data structure that represents the 3-dimensional space and the respective colors for the at least some of the voxels.

(A2) In some examples of A1, extracting the frequency components comprises: extracting a diffused color component as a fundamental frequency component; and extracting a low frequency component as first and second harmonic components.

(A3) In some examples of A1-A2, extracting the frequency components further comprises training a residual neural network to represent high frequency components of the spectral analysis.

(A4) In some examples of A1-A3, the residual neural network is a single layer neural network and training data for the residual neural network model is obtained by subtracting the diffused color component and the low frequency component from a corresponding output of the NeRF model.

(A5) In some examples of A1-A4, the method further comprising storing weights of the residual neural network model as a gray scale image.

(A6) In some examples of A1-A5, the method further comprising: dividing the 3-dimensional space into non-uniformly sized blocks; and storing colors associated with the frequency components for voxels within a corresponding block.

(A7) In some examples of A1-A6, storing the colors comprises omitting colors within a block that are not adjacent to a surface of the subject.

(A8) In some examples of A1-A7, dividing the 3-dimensional space comprises using larger sized blocks for regions of the 3-dimensional space that are further from the subject and using smaller sized blocks for regions of the 3-dimensional space that are closer to the subject.

(A9) In some examples of A1-A8, storing the colors comprises storing the colors within the blocks as a first texture and storing a relative position among the blocks as a second texture.

(A10) In some examples of A1-A9, the sparse volume data structure is a tree data structure having nodes corresponding to the non-uniformly sized blocks.

(B1) In one aspect, some examples include a computer-implemented method for rendering an image of a subject in a 3-dimensional space. The method includes: processing rays from a view point through pixels of the image into the 3-dimensional space, the 3-dimensional space being represented by a sparse volume data structure and a residual neural network; sampling voxels along the rays and accumulating colors for the voxels according to color values stored within the sparse volume data structure; providing a location and viewing angle of the view point to the residual neural network to obtain residual colors for the pixels of the image; and rendering the image by combining the accumulated colors and the residual colors for each pixel of the image.

(B2) In some examples of (B1), the sparse volume data structure is a tree data structure having nodes corresponding to non-uniformly sized blocks within the 3-dimensional space.

(B3) In some examples of (B1)-(B2), larger sized blocks correspond to regions of the 3-dimensional space that are further from the subject and smaller sized blocks correspond to regions of the 3-dimensional space that are closer to the subject.

In yet another aspect, some examples include a computing system including one or more processors and memory coupled to the one or more processors, the memory storing one or more instructions which when executed by the one or more processors, causes the one or more processors perform any of the methods described herein (e.g., method 500 or method 600 described above, A1-A10 or B1-B3 described above).

In yet another aspect, some examples include a non-transitory computer-readable storage medium storing one or more programs for execution by one or more processors of a storage device, the one or more programs including instructions for performing any of the methods described herein (e.g., method 500 or method 600 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for transforming a neural radiance field model, the method comprising:
   providing a plurality of inputs to a neural radiance field (NeRF) model that represents a 3-dimensional space having a subject, wherein each input of the plurality of inputs includes a location and a view direction and corresponds to respective colors of voxels that represent the 3-dimensional space;
   performing a spectral analysis on a plurality of outputs of the NeRF model based on the plurality of inputs, wherein the plurality of outputs include the respective colors of the voxels;
   extracting frequency components of the spectral analysis that represent colors for at least some of the voxels; and
   generating a sparse volume data structure that represents the 3-dimensional space and the respective colors for the at least some of the voxels.

2. The method of claim 1, wherein extracting the frequency components comprises:
   extracting a diffused color component as a fundamental frequency component; and
   extracting a low frequency component as first and second harmonic components.

3. The method of claim 2, wherein extracting the frequency components further comprises training a residual neural network to represent high frequency components of the spectral analysis.

4. The method of claim 3, wherein the residual neural network is a single layer neural network and training data for the residual neural network model is obtained by subtracting the diffused color component and the low frequency component from a corresponding output of the NeRF model.

5. The method of claim 3, the method further comprising storing weights of the residual neural network model as a gray scale image.

6. The method of claim 1, the method further comprising:
   dividing the 3-dimensional space into non-uniformly sized blocks; and
   storing colors associated with the frequency components for voxels within a corresponding block.

7. The method of claim 6, wherein storing the colors comprises omitting colors within a block that are not adjacent to a surface of the subject.

8. The method of claim 6, wherein dividing the 3-dimensional space comprises using larger sized blocks for regions of the 3-dimensional space that are further from the subject and using smaller sized blocks for regions of the 3-dimensional space that are closer to the subject.

9. The method of claim 6, wherein storing the colors comprises storing the colors within the blocks as a first texture and storing a relative position among the blocks as a second texture.

10. The method of claim 6, wherein the sparse volume data structure is a tree data structure having nodes corresponding to the non-uniformly sized blocks.

11. A computer-implemented method for rendering an image of a subject in a 3-dimensional space, the method comprising:
    processing rays from a view point through pixels of the image into the 3-dimensional space, the 3-dimensional space being represented by a sparse volume data structure and a residual neural network;
    sampling voxels along the rays and accumulating colors for the voxels according to color values stored within the sparse volume data structure;
    providing a location and viewing angle of the view point to the residual neural network to obtain residual colors for the pixels of the image; and
    rendering the image by combining the accumulated colors and the residual colors for each pixel of the image.

12. The method of claim 11, wherein the sparse volume data structure is a tree data structure having nodes corresponding to non-uniformly sized blocks within the 3-dimensional space.

13. The method of claim 12, wherein larger sized blocks correspond to regions of the 3-dimensional space that are further from the subject and smaller sized blocks correspond to regions of the 3-dimensional space that are closer to the subject.

14. A non-transient computer-readable storage medium comprising instructions being executable by one or more processors, that when executed by the one or more processors, cause the one or more processors to:
provide a plurality of inputs to a neural radiance field (NeRF) model that represents a 3-dimensional space having a subject, wherein each input of the plurality of inputs includes a location and a view direction and corresponds to respective colors of voxels that represent the 3-dimensional space;
perform a spectral analysis on a plurality of outputs of the NeRF model based on the plurality of inputs, wherein the plurality of outputs include the respective colors of the voxels;
extract frequency components of the spectral analysis that represent colors for at least some of the voxels; and
generate a sparse volume data structure that represents the 3-dimensional space and the respective colors for the at least some of the voxels.

15. The computer-readable storage medium of claim 14, wherein the instructions are executable by the one or more processors to cause the one or more processors to:
extract a diffused color component as a fundamental frequency component; and
extract a low frequency component as first and second harmonic components.

16. The computer-readable storage medium of claim 15, wherein the instructions are executable by the one or more processors to cause the one or more processors to:
train a residual neural network to represent high frequency components of the spectral analysis.

17. The computer-readable storage medium of claim 16, wherein the residual neural network is a single layer neural network and training data for the residual neural network model is obtained by subtracting the diffused color component and the low frequency component from a corresponding output of the NeRF model.

18. The computer-readable storage medium of claim 14, wherein the instructions are executable by the one or more processors to cause the one or more processors to:
divide the 3-dimensional space into non-uniformly sized blocks; and
store colors associated with the frequency components for voxels within a corresponding block.

19. The computer-readable storage medium of claim 18, wherein the instructions are executable by the one or more processors to cause the one or more processors to:
omit colors within a block that are not adjacent to a surface of the subject.

20. The computer-readable storage medium of claim 18, wherein the instructions are executable by the one or more processors to cause the one or more processors to:
divide the 3-dimensional space comprises using larger sized blocks for regions of the 3-dimensional space that are further from the subject and using smaller sized blocks for regions of the 3-dimensional space that are closer to the subject.

* * * * *